United States Patent [19]

Trauben

[11] Patent Number: 5,594,864
[45] Date of Patent: Jan. 14, 1997

[54] METHOD AND APPARATUS FOR UNOBTRUSIVELY MONITORING PROCESSOR STATES AND CHARACTERIZING BOTTLENECKS IN A PIPELINED PROCESSOR EXECUTING GROUPED INSTRUCTIONS

[75] Inventor: Richard D. Trauben, Morgan Hill, Calif.

[73] Assignee: Sun Microsystems, Inc., Mountain View, Calif.

[21] Appl. No.: 454,406

[22] Filed: May 30, 1995

Related U.S. Application Data

[63] Continuation of Ser. No. 875,961, Apr. 29, 1992, abandoned.

[51] Int. Cl.⁶ .............................. G06F 11/25; G06F 11/34
[52] U.S. Cl. ................... 395/183.15; 395/183.14; 395/183.06; 395/183.07; 395/568
[58] Field of Search ...................... 395/183.01, 183.03, 395/183.06, 183.07, 183.09, 183.13, 183.15, 183.14, 375, 500

[56] References Cited

U.S. PATENT DOCUMENTS

| | | | |
|---|---|---|---|
| 4,879,646 | 11/1989 | Iwasaki et al. | 395/375 |
| 5,321,828 | 6/1994 | Phillips et al. | 395/500 |

OTHER PUBLICATIONS

William M. Johnson, *Superscalar Microprocessor Design*, Prentice–Hall, 1991, pp. 32–37 and 63–65.
Lee et al., "Branch Prediction Strategies and Branch Target Buffer Design," *Computer*, Jan. 1984, pp. 6–22.
"Motorola's 68332 Eliminates Glue Logic," *Microprocessor Report*, Jun. 1989, p. 10(3).
Stephen Magnus, "Payoff for IC, Analyzer Cooperation; Better Logic Analyzer Interfaces Are Showing Up Sooner for More Complex (Microprocessors)", *EDN*, Jun. 14, 1990, p. 1(4).

*Primary Examiner*—William M. Treat
*Attorney, Agent, or Firm*—Blakely Sokoloff Taylor & Zafman LLP

[57] ABSTRACT

Methods and apparatus are presented for unobtrusively monitoring processor states and characterizing bottlenecks in an arbitrary customer workload. An instruction queue and an instruction control unit within a pipelined central processor unit (CPU) provide for grouping and issuing multiple instructions per clock cycle for overlapped execution. Additionally, instruction and data caches in operation with integer and floating point function units issue a program counter to the instruction cache, which subsequently supplies instructions to integer and floating point instruction queues. Both integer and floating point unit datapaths comprise fetch, decode, execute, and writeback stages. In the preferred embodiment, ten additional datalines transmitting PIPE signals are routed from the integer and floating point function units to contact pins on an external pin gate array supporting the CPU. The ten PIPE signals provide information on activity of key internal states of the pipelined processor within a single clock cycle. The PIPE signals may be monitored by a logic analyzer, thereby forming an external hardware monitor. By tracing the ten PIPE signals, the number of instructions issued in each stall-free cycle and total number of cycles elapsed may be determined, permitting determination of bottlenecks in customer software on the target CPU, as well as yielding information for optimizing the CPU to execute customer software more efficiently. Based on the accumulated and tabulated performance data, a CPU vendor can reconfigure hardware and/or software to more precisely meet customer workload needs based on determination of customer software operating in the customers actual work environment.

18 Claims, 6 Drawing Sheets

METHOD AND APPARATUS FOR UNOBTRUSIVELY MONITORING PROCESSOR STATES AND CHARACTERIZING BOTTLENECKS IN A PIPELINED PROCESSOR EXECUTING GROUPED INSTRUCTIONS

RELATED APPLICATIONS

This is a continuation of application Ser. No. 07/875,961, filed Apr. 29, 1992, now abandoned.

This application is related to U.S. patent application Ser. No. 5,509,130, entitled "Methods and Apparatus for Grouping Multiple Instructions, Issuing Grouped Instructions Simultaneously, and Executing Grouped Instructions in a Pipelined Processor" filed concurrently herewith.

BACKGROUND OF THE INVENTION

1. Field of the Invention

The present invention relates to the field of pipelined processor computer systems, and more particularly relates to hardware facilities to permit monitoring processor states and characterizing system performance in arbitrary customer workload environments.

2. Art Background

Modern high performance computer systems are typically configured with embedded and external cache memory structures to enhance overall system performance. In computer systems equipped with cache structures, instructions or data residing in single or separate caches reduce or eliminate the need for a time consuming memory references to external memory devices operating on external buses. Unless an instruction or a datum is not resident in the cache when accessed by a processor, no external memory access cycle is required. Moreover, because cache systems are typically implemented using very fast static random access memory (SRAM), overall processor execution speed is greatly improved.

However, as imbedded cache structures become increasingly large, a significant design challenge is encountered wherein monitoring the behavior of a single chip processor (CPU) containing the embedded caches is greatly complicated. Assuming there were perfectly optimized code executing on a cache based single processor CPU, it would be possible for the processor to execute code continuously from within its internal cache stores with no external manifestations of its cycle by cycle progress for significant periods of time. In such a case, system debugging can be very difficult.

To further improve system performance, many computer systems are constructed with pipelined processors, wherein multiple instructions may be simultaneously overlapped during instruction execution, and thereby increasing processor throughput. Traditionally, all instructions and data being processed by the pipeline processor were required to proceed at the same rate, the CPU performance therefore being determined by the slowest pipe stage. However, many pipelined CPU's today permit the various function units to proceed independently and at their own rate. However, as the likelihood for pipeline hazard occurrence is thereby increased, modern pipelined CPU's are typically optimized to reduce likelihood of such occurrences, including synchronization of pipeline stages and tabulation of instruction status to permit scheduling code around such hazards.

Alternatively, once a CPU with embedded caches has been debugged and is installed and operational in a customer workplace, a processor vendor may desire to thereafter monitor and characterize performance of his system in a unobtrusive manner, particularly in situations where the customer is running confidential or proprietary software which he does not wish to disclose to the vendor. A vendor may wish to so characterize his system as installed in the customer workplace for a number of reasons. One major reason would be to determine operational performance bottlenecks in his system executing the proprietary software under real world conditions, so that the system may be reconfigured or memory allocations altered to optimize system performance to the customer workload and requirements. In addition, it is particularly desirable if the results of the system characterization could be tabulated, stored, and later used to overcome similar design constraints and bottlenecks in future product designs, especially as may relate to selected customers for whom systems optimization is of paramount concern. It would further be desirable to be able to monitor first order behavior of the processor, and to make available on a cycle by cycle basis information related to key internal states of the target processor.

As will be obvious, from the following detailed description, these objects and desired results are among the objects and desired results of the present invention, which provides a novel approach to providing an unobtrusive hardware monitor for determination of computer system performance within the customer workplace.

For further description of the pipelining, and descriptions of cache memory systems and cache implementations, see Hennessy & Patterson, "*Computer Architecture-A Quantitative Approach*", (1990).

SUMMARY OF THE INVENTION

The method and apparatus for unobtrusively monitoring processor states and characterizing bottlenecks in an arbitrary customer workload are disclosed. In the preferred embodiment, an instruction queue and an instruction control unit are provided within a pipelined central processor unit (CPU) for grouping and issuing multiple instructions per clock cycle for overlapped execution. Additionally, inside the processor are an instruction cache and a data cache, wherein a core controller issues a program counter to the instruction cache, which subsequently supplies the instruction to the instruction queue. The instruction is subsequently decoded and addresses computed for subsequent memory references. Thereafter the data cache supplies necessary data to the instruction unit for ultimate execution in a pipelined integer unit datapath. Similarly, there exists a floating point queue, a floating point control unit, and a floating point register file, which are coupled to a pipelined floating point datapath. The floating point modules receive instructions from the integer control unit and data from the data cache in a fashion similar to the integer modules. Both integer and floating point unit datapaths comprise fetch, decode, execute, and writeback stages.

In the preferred embodiment, ten additional datalines transmitting PIPE signals are routed from the integer and floating point datapaths to external contact pins on a pin gate array supporting the CPU. The ten pipe signals provide information on activity of key internal states for instructions at the execution stage of the pipelined processor, including 1. The number of instructions completing execution.
2. When no instructions are executed, whether the queue was empty.

3. Whether any instructions are branches, and if so which branch path was chosen (i.e., sequential instruction stream vs. target instruction stream).

4. Whether any instructions are data memory references, and if so whether data of the memory reference can be supplied to the pipe in the same cycle.

5. Whether any instructions are floating point arithmetic instructions, and if so whether they can be completed in the same cycle.

6. Whether any instructions are an explicit system call or incurred an interrupt or exception.

The ten PIPE signals may be monitored by connecting the additional pins to a logic analyzer, thereby forming an external hardware monitor. The monitoring occurs at the execute stage of a pipelined instruction, beginning at the first instruction in a program. By tracing the ten additional datalines, the number of instructions issued in each stall-free cycle as well as the number of cycles elapsed, may be determined. In addition, instantaneous and cumulative performance of a CPU may be measured in terms of instructions executed per cycle by logically combining certain of the ten data lines, and subsequently latching the combined signal with the system clock. The current state of the additional data lines will permit determination of bottlenecks in customer system software on the target CPU, as well as yielding information for optimizing the CPU to execute customer software more efficiently.

Analysis and statistical data derived from the ten additional data lines includes:

1. Percentage of memory references, control transfers, and floating point operations and integer arithmetic;

2. Histograms of executed instruction group size;

3. Cause of stalled processor pipeline cycles;

4. Histograms of duration for stalled pipe processor pipeline cycles; and

5. Histograms of elapsed time between context switches.

Based on the accumulated and tabulated performance data, a CPU vendor can reconfigure hardware and/or software to more precisely meet customer workload needs based on determination of customer software operating in the customers actual work environment.

BRIEF DESCRIPTION OF THE DRAWINGS

The objects, features and advantages of the present invention will be apparent from the following detailed description of the preferred embodiment of the invention with references to the drawings in which.

DETAILED DESCRIPTION OF THE PRESENTLY PREFERRED AND ALTERNATE EMBODIMENTS

Methods and apparatus for unobtrusively monitoring processor states and characterizing bottlenecks in a pipelined processor executing grouped instructions are disclosed. In the following description, for purposes of explanation, specific numbers, materials and configurations are set forth in order to provide a thorough understanding of the present invention. However, it will be apparent to one skilled in the art that the present invention may be practised without these specific details. In other instances, well known systems are shown in diagrammatical or block diagram form in order not to obscure the present invention unnecessarily.

Figure 1:
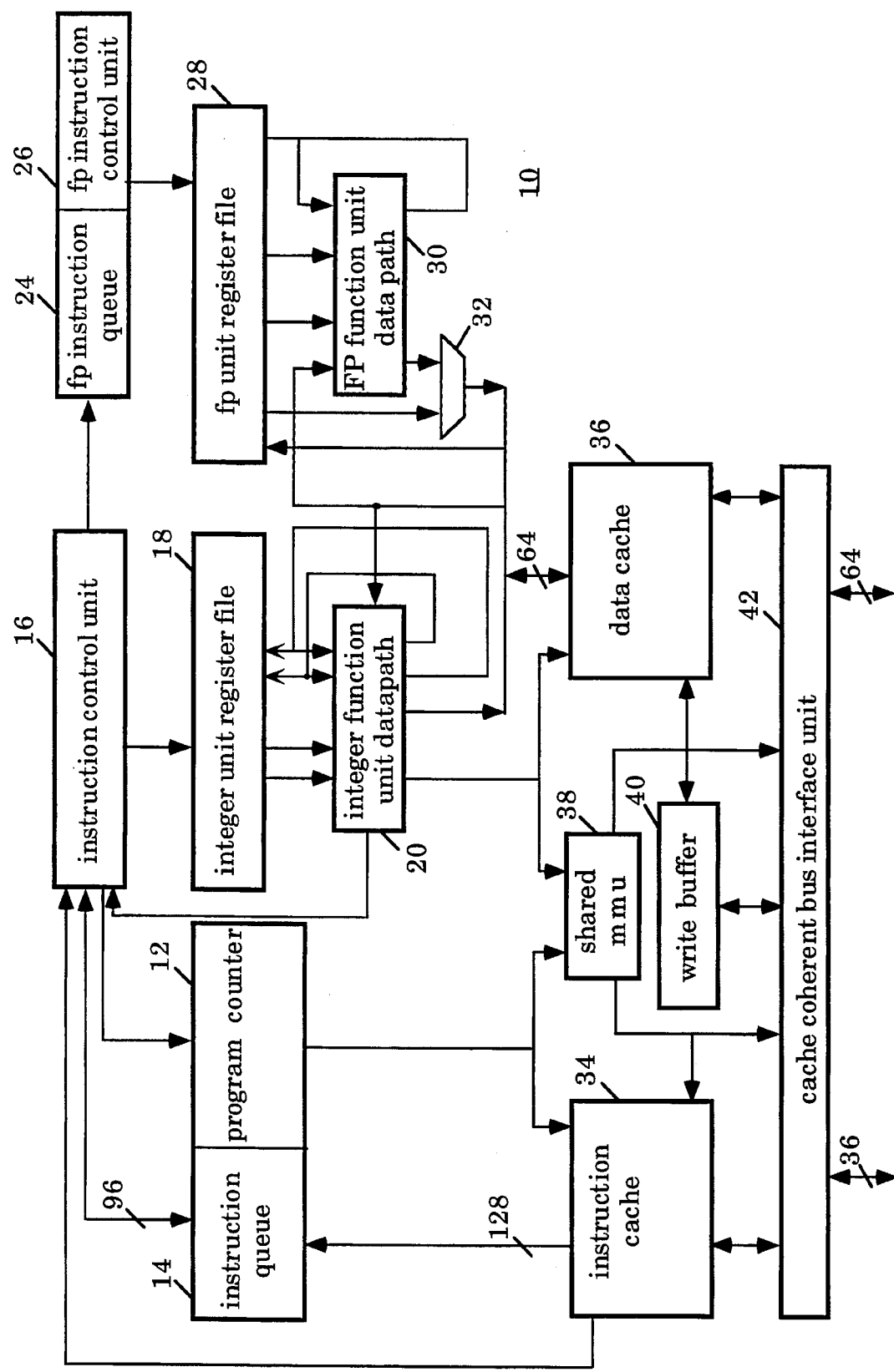
FIG. 1 illustrates a functional block diagram of a pipelined processor incorporating the teachings of the present invention.

Reference is now made to FIG. 1, wherein a functional block diagram illustrating an exemplary pipelined processor incorporating the teachings of the present invention is shown. Shown is an exemplary pipelined processor 10 comprising a program counter 12, an instruction queue 14 and an instruction control unit 16. The program counter 12, the instruction queue 14, and the instruction control unit 16 are coupled to each other, and together issue at most three instructions simultaneously per clock cycle. Except for the manner in which the program counter 12 cooperates with the instruction control unit 16, the program counter 12 is intended to represent a broad category of program counters found in most pipelined processors. The basic functions and constitutions of these devices are well known and will not be described further. The instruction queue 14, the instruction control unit 16 and the manner in which they cooperate with each other, and the program counter 12 are described in specific detail in the above-referenced copending U.S. patent application Ser. No. 5,509,130, entitled "Methods and Apparatus for Grouping Multiple Instructions, Issuing Grouped Instructions Simultaneously, and Executing Grouped Instructions in a Pipelined Processor".

For ease of understanding the present invention, the present invention is described in terms of the exemplary processor 10 whose program counter 12, instruction queues 14 and instruction control unit 16 cooperate to issue at most three instruction simultaneously per clock cycle. However, based on the description to follow, it will be appreciated that alternatively the present invention may be practiced with these elements cooperating to issue at most m instructions simultaneously per clock cycle, provided all other complementary design considerations are adjusted accordingly. Those skilled in the art will further appreciate that the choice of m, where m is relatively small, is a tradeoff between further increases in execution performance gain versus further increases in the time required to determine an instruction group and implementation complexity. However, the time required to determine an instruction group, and the implementation complexity increases in a non-linear manner as m increases. At some point, the time required to determine an instruction group and/or the implementation complexity will outweigh the savings in instruction execution time.

Still referring to FIG. 1, the pipelined processor 10 further comprises an integer unit register file 18, and an integer function unit 20. The integer unit register file 18 is coupled to the instruction control unit 16, and the integer function unit 20, which in turn is coupled to the program counter and processor status register file 12. The integer unit register file 18 and the integer function unit 20 cooperate to generate at most two integer results per clock cycle. The integer unit register file 18 comprises four independent register ports. The four independent register ports, when time multiplexed, provide the equivalent capacity of six read and two write ports, sufficient to support either concurrent reading of two address registers, or concurrent reading of four data registers or concurrent writing of any two registers. Except for the read/write bandwidth of the integer unit register file 18, and the manner in which the integer unit register file 18 cooperates with the integer function unit 20, the integer unit register file 18 is intended to represent a broad category of register files found in most pipelined processors. The basic functions and constitutions of register files are well known and will not be described further. One embodiment of the integer function unit 20, and the manner in which the integer function unit 20 cooperates with the integer unit register file 18 is described in specific detail in the above-referenced copending application.

As above, for ease of understanding the present invention, the present invention is described in terms of the exemplary processor 10, whose integer unit register file 18 and integer function unit 20 cooperate to generate at most two integer results per clock cycle. However, based on the description to follow, it will be appreciated that alternatively the present invention may be practiced with these elements cooperating to generate at most $n_1$ integer results per clock cycle, provided all other complementary design considerations, in particular, the integer function unit 20, are adjusted accordingly.

The exemplary pipelined processor 10 also comprises a floating point instruction queue 24, a floating point instruction control unit 26, a floating point unit register file 28, a floating point function unit 30, and a multiplexor 32. The floating point instruction queue 24 is coupled to the instruction control unit 16 and the floating point instruction control unit 26, which in turn is coupled to the floating point unit register file 28. The floating point unit register file 28 is also coupled to the floating point function unit 30, and the multiplexor 32. Together, they generate at most one floating point result per clock cycle.

Except for the manner in which the floating point instruction queue 24 cooperates with the instruction control unit 16, the floating point instruction queue 24, the floating point instruction control unit 26, the floating point unit register file 28, the floating point unit 30, and the multiplexor 32 are intended to represent a broad category of elements found in most pipelined processors. Their basic functions and constitutions are well known and will not be described further. The manner in which the floating point instruction queue 24 cooperates with the instruction control unit 16 is described in specific detail lin the above-referenced copending U.S. Patent Application. For ease of understanding the present invention, the present invention is being described with the exemplary processor 10, whose floating point instruction queue 24, floating point instruction control 26, floating point unit register file 28, floating point function unit 30 and multiplexor 32 cooperate to generate at most one floating point result per clock cycle. However, it will be appreciated by those skilled in the art that alternatively the present invention may be practiced with these elements cooperating to generate at most $n_2$ floating point results per clock cycle, provided all other complementary design considerations, in particular, the floating point instruction queue 24, the floating point instruction control unit 26 and the floating point function unit 30, are adjusted accordingly.

Still referring to FIG. 1, the exemplary pipelined processor 10 also comprises an instruction cache 34, a data cache 36, a shared memory management unit (MMU) 38, a write buffer 40, and a cache coherent bus interface unit 42. The MMU 38 contains a translation lookaside buffer (TLB) (not shown) to buffer data and instruction requests issued to instruction and data caches 34 and 36, or to main memory devices operating on the cache bus interface unit 42. The instruction cache 34 is coupled to the program counter 12, instruction queue 14, the shared memory management unit 36, and the cache coherent bus interface unit 42. The data cache 36 is coupled to the address adder 22, the integer function unit 20, a floating point instruction queue 24, a floating point instruction control unit 26, a floating point unit register file 28, a floating point function unit 30, and a multiplexor 32. The floating point instruction queue 24 is coupled to the instruction control unit 16 and the floating point instruction control unit 26, which in turn is coupled to the floating point unit register file 28. The floating point unit register file 28 is also coupled to the floating point function unit 30, and the multiplexor 32. Together, they generate at most one floating point result per clock cycle. Except for the manner in which the floating point instruction queue cooperates with the instruction control unit 16, the floating point instruction queue 24, the floating point instruction control unit 26, the floating point unit register file 28, the floating point unit 30, and the multiplexor 32 are intended to represent a broad category of these elements found in most pipelined processors. Their basic functions and constitutions are well known and will not be described further. The manner in which the floating point instruction queue 24 cooperates with the instruction control unit 16 are described in specific detail in the above-referenced copending U.S. Patent Application.

Figure 2:
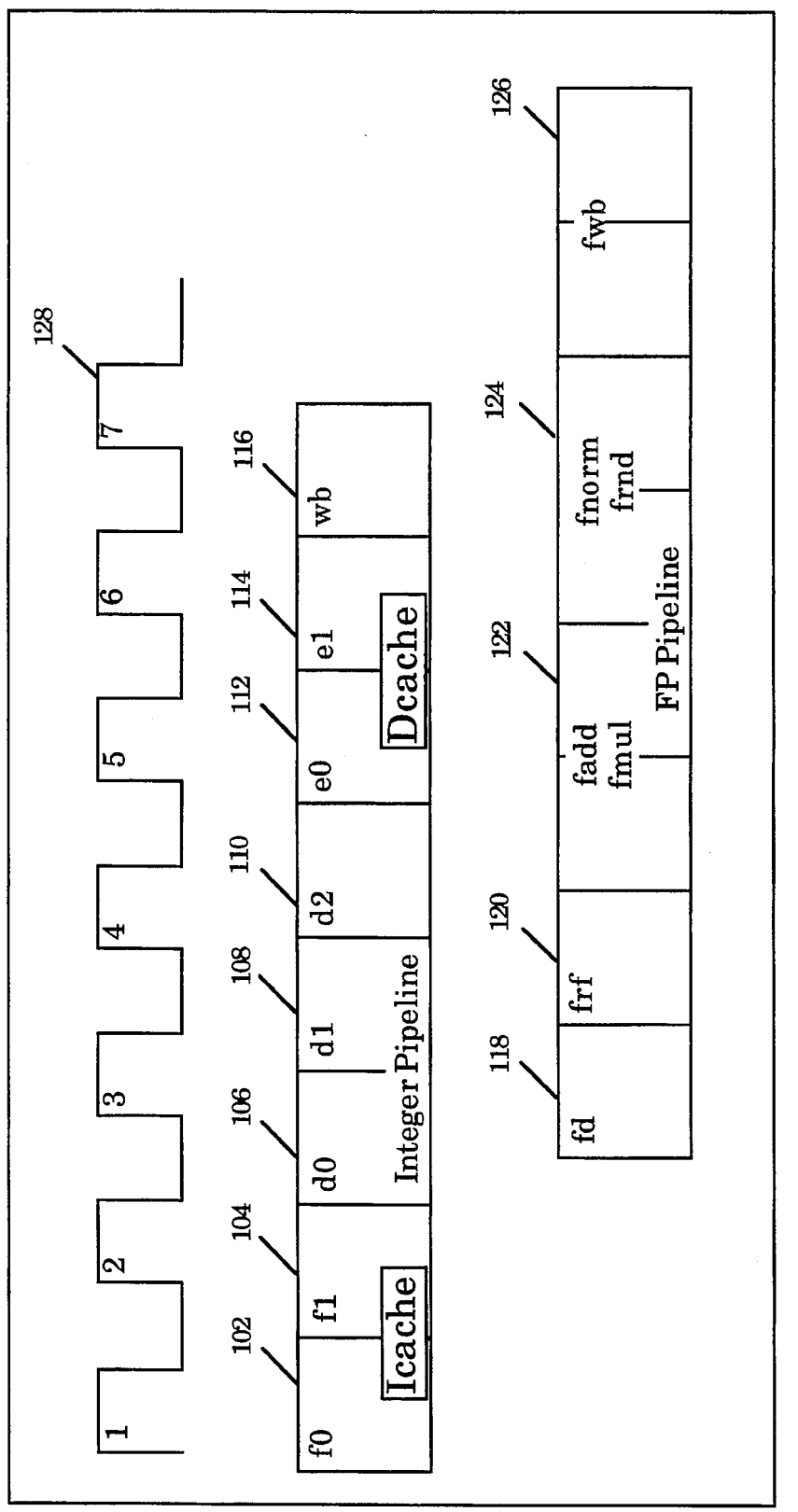
FIG. 2 illustrates the presently preferred embodiment of the pipeline stages of the pipelined processor shown in FIG. 1.

Referring now to FIG. 2, a block diagram illustrating the presently preferred embodiment of the pipeline stages of the present invention incorporated in the pipelined processor 10 of FIG. 1 is shown. Shown in FIG. 2 is a plurality of integer pipeline stages 102–116, and a plurality of floating point pipeline stages 118–126. Also shown is a series of clock pulses 128, comprising seven clock cycles. The integer pipeline stages 102–116 comprise two instruction fetching stages (f0 and f1), 102 and 104, three instruction decoding stages (d0, d1 and d2), 106–110, two execution stages (e0 and e1), 112 and 114, and one write back stage (wb) 116. The floating point pipeline stages 118–126 comprise two instruction decoding stages (fd and frf), 118 and 120, two execution stages (fadd/fmul and fnorm/frnd), 122 and 124, and one write back stage 126. Except the floating point execution stages (fadd/fmul and fnorm/frnd), 122 and 124, each pipeline stage, 102, . . . 120, or 126, takes half a clock cycle. Each floating point execution stage (fadd/fmul or fnorm/frnd), 122 or 124, takes one clock cycle. It will be appreciated that the present invention may be practiced without some of these exclusion rules or with additional exclusion rules, depending on the particular implementation of the pipelined processor.

Figure 3:
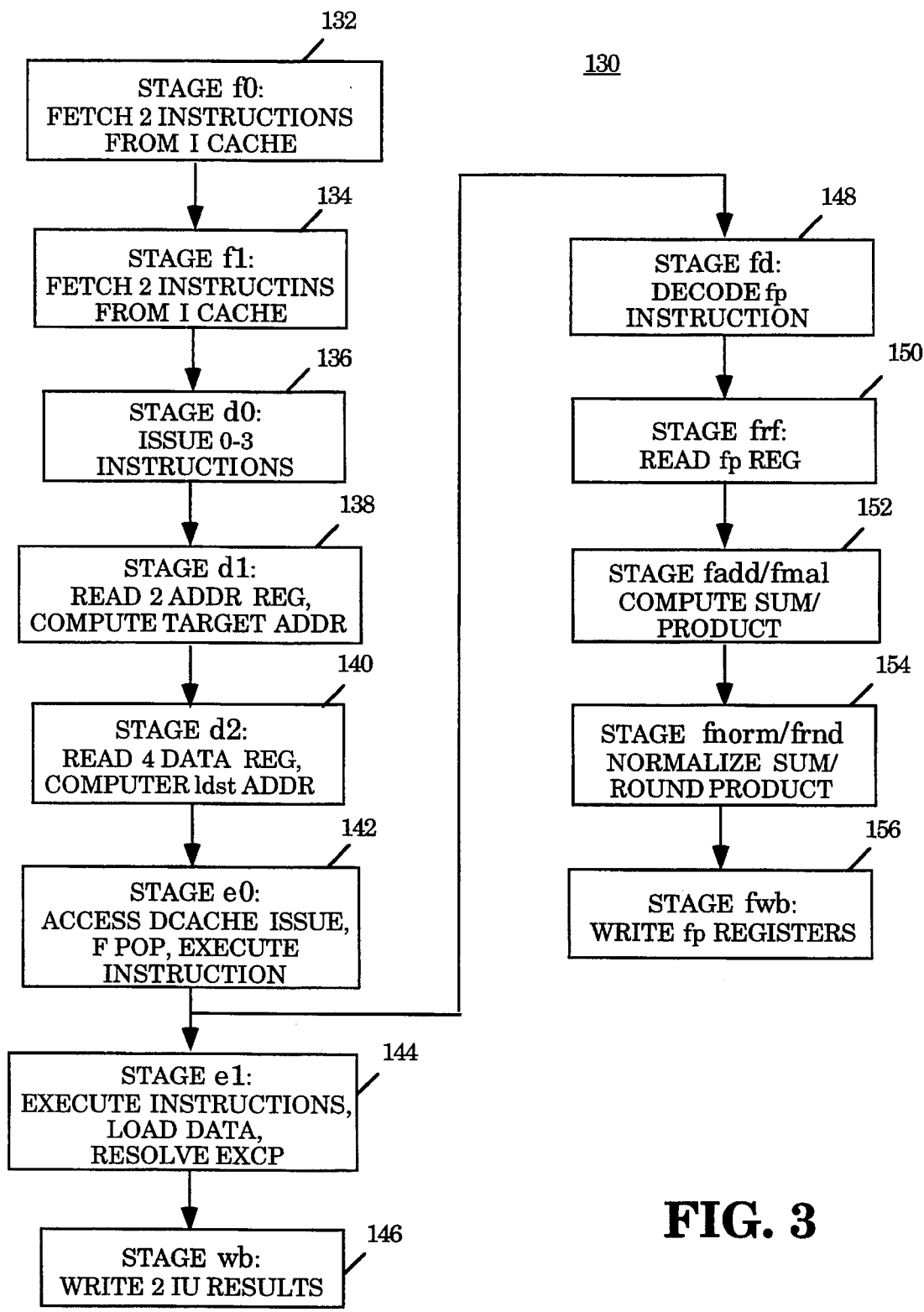
FIG. 3 illustrates a flow diagram illustrating the operating flow of the pipeline shown in FIG. 2.

Referring now to FIG. 3, a block diagram illustrating the operational flow at the various pipeline stages of the pipeline of FIG. 2 is shown. At stages f0 and f1, four instructions are fetched from the instruction cache, two instructions per stage, blocks 132 and 134.

At stage d0, up to three instructions are simultaneously issued to the integer function unit and/or the floating point queue for execution, block 136. At stage d1, two address registers in the integer unit register file are read, and the target address of a branch instruction is computed, block 138. At stage d2, four data registers in the integer unit register file are read, and the load/store address of a load/store instruction is computed, block 140.

At stage e0, the data cache is accessed, the floating point operations are issued, and the first instruction in the integer unit is executed, block 142. At stage e1, the second instruction in the integer unit is executed, data are loaded from the data cache/memory, and exception conditions are resolved, block 144. At stage wb, two integer results are written to the data cache/memory or the integer unit register file, block 146.

In the presently preferred embodiment of processor 10, floating point operation is tightly coupled to integer pipeline stages 102–116. A floating point operation may be started every cycle, but is dispatched late into the processor pipeline. Floating point operations are not issued to floating point unit 30 until the e0 (block 142, FIG. 3) stage of the integer pipeline. Forwarding paths are provided to chain any result of a floating point operation to a source for subsequent operations. As shown in FIG. 3, the floating instruction is decoded at stage fd, block 148. At stage frf, the floating point register file is read, block 150. At stage fadd/fmul, either a floating point sum or a floating product is completed, block 152. At stage fnorm/frnd, either the floating point sum is normalized or the floating point product is rounded, block 154. At stage fwb, the floating point result is written back into the floating point register file, block 156.

Figure 4A:
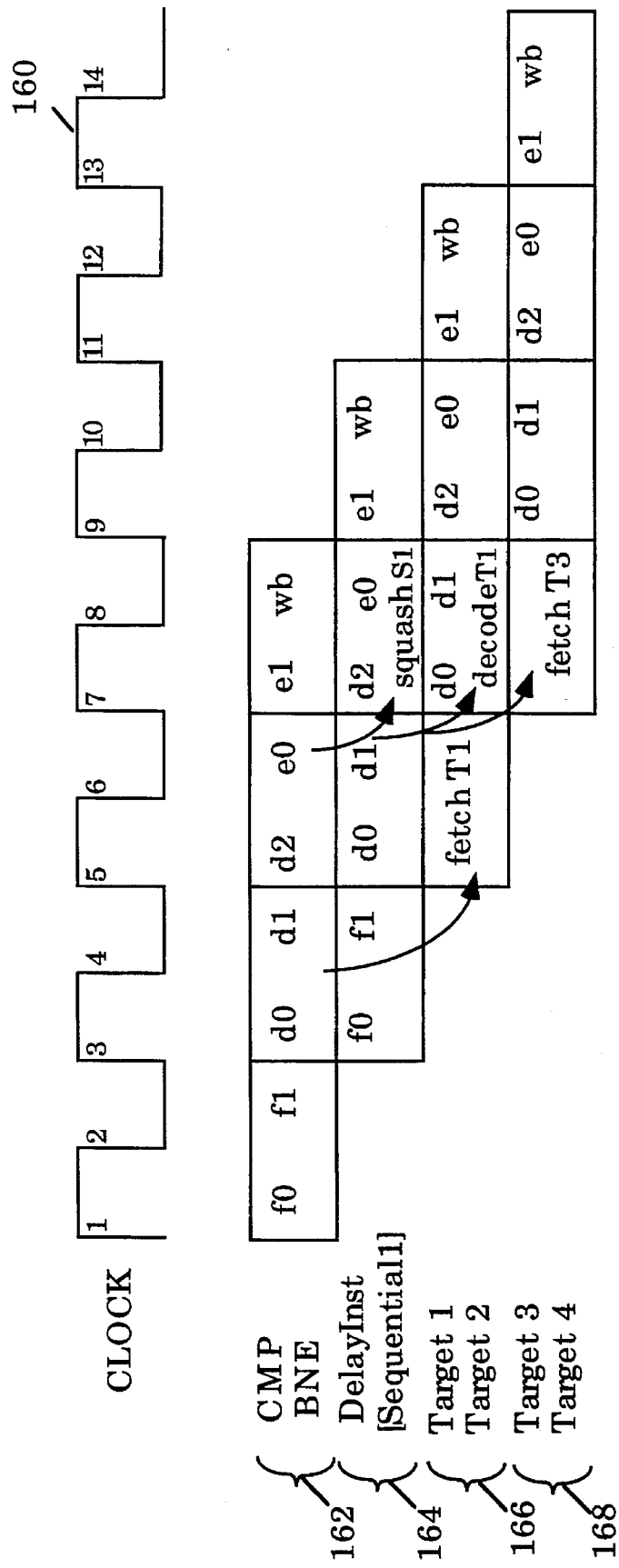
FIGS. 4a and 4b illustrate handling of branch instructions within the pipeline illustrated in FIG. 2.
Figure 4B:
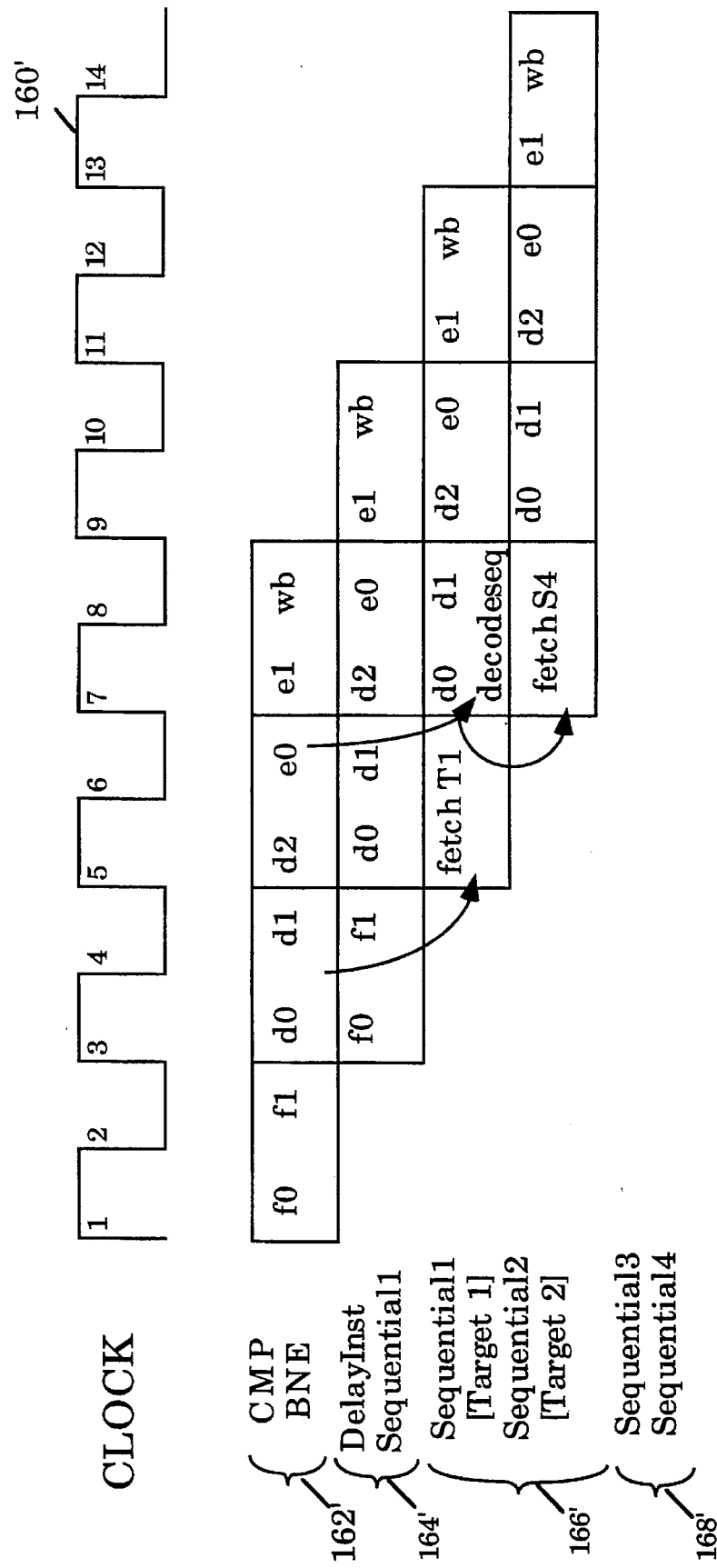

Reference is now made to FIGS. 4a and 4b, wherein two block diagrams illustrating the handling of branch instructions for the pipeline of FIG. 3 is shown. FIG. 4a illustrates the case when a branch is taken, whereas FIG. 4b illustrates the case when a branch is not taken.

Shown in FIG. 4a are four exemplary instruction groups, 162–168, moving through the integer pipeline 100. At time 3, the instruction control unit issues the first exemplary two instruction group, comprising a compare instruction (CMP) and a branch on not equal instruction (BNE), to the integer function unit 20 for execution. The instruction control unit 16 detects the branch instruction in the course of forming the instruction group. The prefetch controller assumes the branch is going to be taken, and waits until the delay instruction is present in an sequential instruction queue (not shown) before fetching the target instruction streams.

At time 5, the instruction control unit issues the second exemplary two instruction group comprising the fetched delay instruction and the next sequential instruction to the integer function unit 20 for execution. At the same time, the instruction control unit 16 causes the first and second target instructions to be fetched into a target instruction queue (not shown).

At time 6, the branch is resolved by the integer function unit with the branch being taken and the program counter and processor status register file updated accordingly. Therefore, at time 7, the instruction control unit 16 squashes the first sequential instruction and the prefetch controller moves context of the target instruction queue to the sequential instruction queue. The instruction control unit 16 squashes the first sequential instruction. At the same time, the instruction control unit moves the third exemplary two instruction group comprising the first and second target instructions to the opcode decode and cascade detector for instruction decoding and data dependency detection. Furthermore, the instruction control unit causes the third and fourth target instructions to be fetched into the target instruction queue.

Shown in FIG. 4b are four exemplary instruction groups, 162'–168', moving through the integer pipeline 100 wherein a branch is not taken. At time 3 the instruction control unit 16 issues the first exemplary two instruction group, comprising a compare instruction (CMP) and a branch on not equal instruction (BNE), to the integer function unit 20 for execution. The instruction control unit 16 again detects the branch instruction in the course of forming the instruction group, and assumes the branch is going to be taken, waits until the delay instruction is present in the sequential instruction queue before fetching the target instruction stream.

At time 5, the instruction control unit 16 issues the second exemplary two instruction group comprising the fetched delay instruction and the next sequential instruction to the integer function unit for execution. At the same time, the instruction control unit 16 fetches the first and second target instructions into the target instruction queue.

At time 6, the branch is resolved by the integer function unit with the branch not being taken. At time 7, the instruction control unit permits the first sequential instruction continue to move down the integer pipeline by not squashing the first sequential instruction, and the prefetch controller discards the fetched first and second target instructions. At the same time, the instruction control unit 16 moves the third exemplary two instruction group comprising the second and third sequential instructions to the opcode decoder and cascade detector for instruction decoding and data dependency detector. Thereafter, the instruction control unit fetches the fourth and fifth sequential instructions into the sequential instruction queue.

Figure 5:
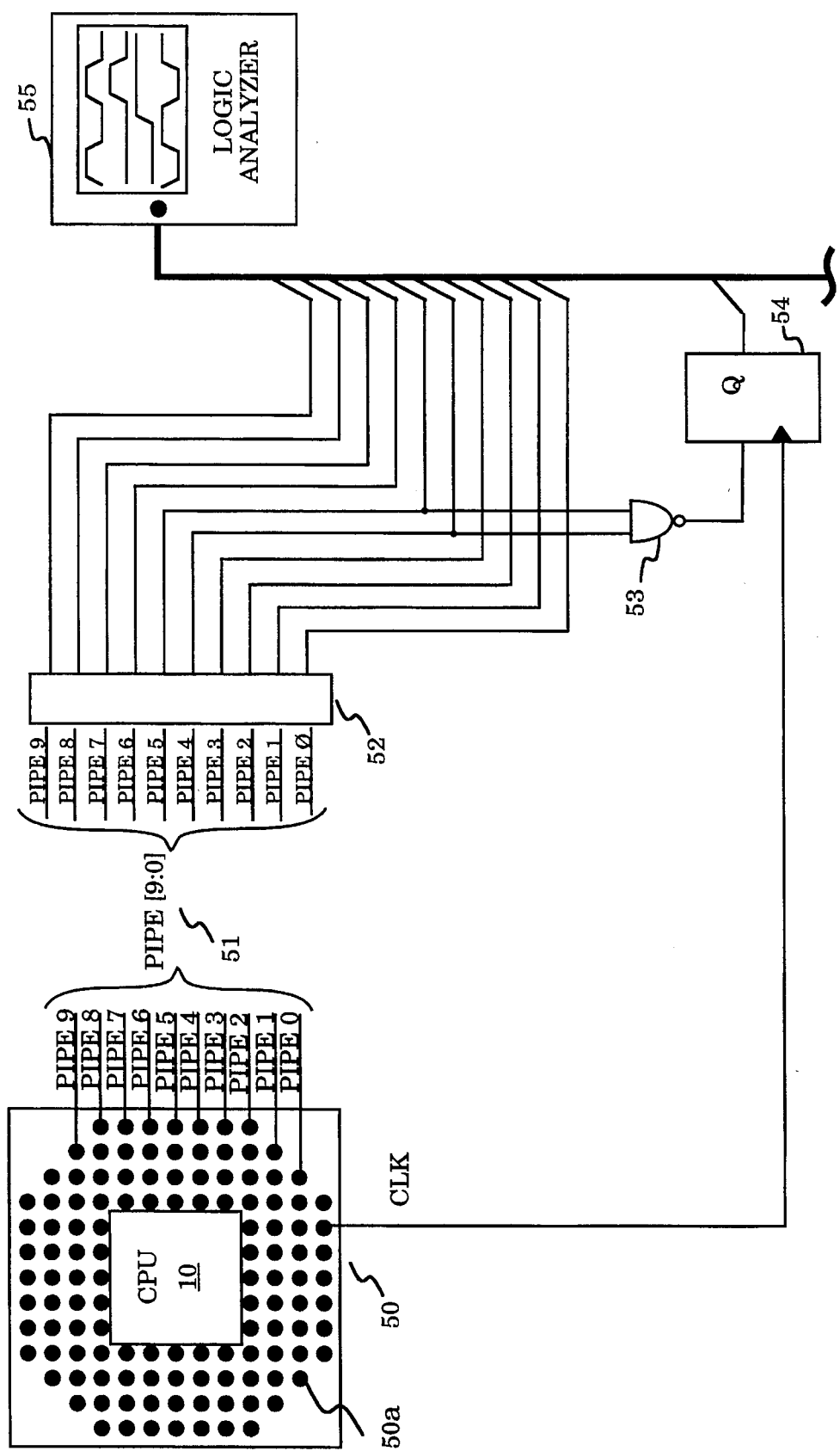
FIG. 5 illustrates an exemplary arrangement of the present invention to provide a CPU performance monitor.

Reference is now made to FIG. 5, wherein processor 10 is shown in an exemplary arrangement to monitor states within processor 10 during execution of an application workload. In FIG. 5, processor 10 is mounted to an external, supporting pin grid array (PGA) 50. Datalines emanating from processor 10 terminate on a multiplicity of pins 50a within PGA 50. Pins 50a transmit a multiplicity of PIPE signals 51. As presently preferred, ten PIPE signals 51 (PIPE0–PIPE9) are routed through a suitable connector 52 to a logic analyzer 55.

To monitor the first order behavior of processor 10, PIPE signals 51 provide cycle by cycle observation possible for key internal states of the target processor. These pins provide information on activity within a clock cycle:

- the number of instructions which complete execution,
- when zero instructions are executed whether the cause is a pipeline interlock or an empty instruction queue (due to an instruction cache miss),
- whether any of said instructions are a branch and if so which branch path was taken,
- whether any of said instructions are a data memory reference, and if so whether they can be provided to the processor pipeline in the same cycle.
- whether any of said instructions are a floating point arithmetic instruction, and if so whether they can complete in a single cycle.
- whether any of said instructions are an explicit system call or incur an interrupt or exception necessitating an implied system call to the target processor system software.

1. PIPE Signals:

The following table identifies the function of each PIPE signal:

PIPE9 Asserted when any valid data memory reference instruction is present in the execute stage of the processor pipeline.

PIPE7 Asserted when any valid control transfer instruction is present in the execute stage of the processor pipeline.

PIPE6 Asserted when no instructions were available when the instruction now at the execute stage of the pipeline was dispatched.

PIPE5 Asserted when the processor pipeline is stalled by inability to serve data memory references in a single cycle (e.g. data cache miss). (DBUSY)

PIPE4 Asserted when the processor pipeline is stalled by inability of the floating point engine to proceed in the current cycle (e.g. floating point memory reference interlock). (FBUSY)

PIPE3 Asserted when the target instruction stream of a control transfer instruction is chosen (rather than a sequential instruction stream).

PIPE[2:1] Indicates the number of instructions currently residing at the execute stage of the processor pipeline.

PIPE0 Asserted when an iexplicit system call, interrupt or instruction exception has been incurred.

2. Utility of Pipe Signals in Constructing an External Hardware Monitor

These ten PIPE signals 51 can be monitored by logic analyzer 55 to form an external hardware performance monitor. The monitor can determine the current state of processor 10, the approximate instruction mix, the actual rate of interrupts, calls, and some indication of what are the current performance bottlenecks of processor 10.

By beginning execution at the first instruction in an assembly language program, one can trace the progress of processor 10 through the program. Branch paths chosen are unambiguously exposed and behavior for that program can be compared to expected values. By tracing pins 51, and by tabulating the number of instructions issued every stall-free cycle as well as the number of cycles elapsed to date, the arrangement of the present invention can report instantaneous and cumulative performance of the processor 10 in terms of instructions executed per cycle, without necessitating access to the proprietary application workload being executed. In other words, an unobtrusive performance meter for the application program being run can be implemented.

Also shown in FIG. 5, two of PIPE signals 51 (PIPE4 and PIPE 5) are logically combined in a NOR gate 53, whereafter the result is latched into a latch 54 upon the next system clock (CLK) signal derived from processor 10. The output of latch 54 is a composite signal CYCLE0. By logically NORing together the PIPE5 and PIPE4 pins (DBUSY and FBUSY) and then latching the composite signal with CLK to from an external signal called CYCLE0, the current state of PIPE pins 51 can be further studied to learn about the customer workload and its execution characteristics on the target processor. For example:

The total number of instructions can be counted;

These instructions can be broken down into data memory reference, control transfers, and floating point operations. The balance can be lumped together as integer arithmetic instructions;

Histograms of executed instruction group size can be generated;

The dominant cause of stalled processor pipeline cycles can be generated.

2.1 Estimating the effective data cache miss rate:

There are three main reasons why a data memory reference can stall the processor pipeline on CYCLE0:

A "data" translation lookaside buffer (TLB) within MMU 38 (FIG. 1) has missed: To determine the physical address for the virtual address of the data memory reference instruction, the TLB needs to fetch entries from the virtual memory address translation table in main memory via the bus interface unit (FIG. 1, box 42) (not shown).

The first level data cache 36 (FIG. 1) has missed on a load operation: The first level data cache 36 needs to allocate room and then fetch the contents from slower resources within the memory hierarchy (e.g. second level external cache or main memory).

The write store buffer 40 (FIG. 1) is full: The store buffer 40 must write some of its contents to memory before allowing the data memory reference in the execute stage to proceed.

Additional second order reasons for stalls on a data memory reference instruction are:

The store buffer 40 contains an entry which is being requested by the memory reference instruction. To maintain a sequence of write instructions as seen by other processors in the system, the store buffer will stall the processor pipeline 128 (FIG. 2) and copy out all contents through the requested entry before allowing the load to complete.

Synchronous store instruction resides at the execute stage e0 (FIG. 2): These instructions stall the processor pipeline 128 until the hardware has updated machine state. (e.g., STORES to Alternate Address Space identifiers corresponding to control registers in the MMU 38, data cache 36, or store buffer 40.)

An atomic read-modify-write instruction resides at the execute stage: These instructions take multiple cycles on the target machine.

Several of the above causes may be simultaneously active. The PIPE signals 51 do not specify which of these reasons is the actual cause of stalling the processor pipeline during a DBUSY (PIPE5) pipeline stall.

Due to novel techniques implemented in the preferred embodiment of processor 10, (described in the above-referenced U.S. Patent Application) cache consistency transactions will not steal opportunities of the internal processor pipeline to access the single ported data cache. This is in marked contrast to typical processor designs which allow stall cycles on data cache accesses to implement a cache write consistency policy. For example, consider the case of a write back cache. During any remote cache read miss, all caches on the system bus are required to perform a data cache address lookup and forward data if they have an up-to-date copy. During any write from a remote cache, all caches on the system bus are required to perform a data cache address lookup to invalidate a stale local copy. The disclosed processor does maintain processor consistency but does not allow these consistency transactions to stall the processor.

As a first order estimate, one can assume that all DBUSY cycles where FBUSY is unasserted are due to load misses on first level data cache 36. This allows one to determine the fraction of data memory reference instructions at the execute stage which incur a DBUSY. This fraction is called the effective data cache miss rate.

When using this methodology, the resulting effective data cache miss rate is higher than the actual data cache miss rate because the other two causes are lumped together with it. This first order approximation can be refined by examining additional processor pins or revising the application code.

2.2 Determining the frequency of floating point code interlocks:

There are three main reasons why a floating point operate or floating point data memory reference can stall the processor pipeline on CYCLE0:

The floating point instruction queue 24 is full: There is no more room to accept the floating point operation (FPQP) instruction that the integer control unit 16 seeks to dispatch to the floating point function unit 30. This can occur while the floating point unit 30 is busy computing several long latency FP arithmetic instructions such as divide or square root.

The destination register of a floating point lcad instruction is interlocked. When a floating point lcad attempts to update a floating point register and that register is the destination register of any uncompleted FP arithmetic instruction in the floating point instruction queue 24, the floating point unit 30 will stall the pipeline for integer function unit 20 until all such FQ FP arithmetic instructions complete.

The source register of a floating point store instruction is interlocked. When a floating point store attempts to write data to memory with a floating point register whose value is not yet computed, the floating point function unit 30 will stall the pipeline for integer function unit 20 until all such FQ FP arithmetic instructions complete.

Additional second order reasons for stalls on a floating point operate instructions are:

Floating point condition codes are interlocked. When a floating point branch attempts to use the results of a pending uncompleted floating point compare instruction, the floating point function unit 30 will stall the pipeline.

The results of an integer multiply or divide are not yet ready. The integer function unit 20 uses the floating point function unit 30 to convert the operands to floating point format, perform the respective computations, convert the result from floating point format back to integer format, and return the integer results back to the integer function unit 20. Integer multiply and divide instructions can start execution in the floating point unit only when the floating point instruction queue 24 is empty. Once empty it takes several cycles to compute results.

Several of the above causes may be simultaneously active. In addition, it is possible for DBUSY (PIPE5) and FBUSY (PIPE4) to be simultaneously active. The PIPE signals 51 do not specify which of the above reasons is the actual cause of stalling the processor pipeline during a FBUSY pipeline stall.

As a first order estimate, one can assume that all FBUSY cycles, where DBUSY is unasserted, are due to poorly scheduled floating point memory references which do not track the latency required to produce floating point results. This approximation can be refined by revising the code scheduling for inner loops of floating point code workloads to see which of these factors dominates. Floating point lccp unrolling and software pipelining are useful techniques to overcome these floating interlocks.

2.3 Estimating the Effective Instruction Cache Miss Rate:

No processor pipeline can execute instructions faster than it fetches them from the memory hierarchy. The disclosed processor 10 contains a large dedicated, on-chip, first level instruction cache to provide single cycle accesses to instruction memory to speed instruction fetch. The instruction cache nominally provides 4 words to the prefetch buffer on an instruction cache hit. The 8 word instruction prefetch buffer is nominally filled, independent of whether the processor pipeline stalls. However, the above scheme can not always provide a valid instruction stream to the processor pipeline.

The PIPE[2:1] signals describe how many instructions reside at the execute stages e0 and e1 of the pipe 128. When zero instructions are resident, there are four main potential causes:

The code TLB within MMU 38 (FIG. 1) has missed: To determine the physical address for the virtual address of the code fetch resulting in the miss, the TLB needs to fetch entries from the virtual memory address translation table (not shown) via the bus interface unit 42 (FIG. 1).

The first level instruction cache 34 (FIG. 1) has missed. The instruction cache 34 needs to invalidate entries to make room and then fetch the contents from slower resources within the memory hierarchy (e.g. second level cache or main memory).

A data dependency between instruction groups at different stages of the processor pipeline exists e.g., at stages f0/f1 and e0/e1, and that dependency can not be satisfied by existing forwarding paths.

A delay instruction of an untaken annulled branch was issued by squashed before reaching the e0 execute stage.

Additional causes for zero instructions executed are:

Control transfer instructions which generate their target addresses based on integer register file entries incur a single pipeline "bubble". A pipeline bubble is inserted by the code scheduler when an instruction references a still-pending register relative target address.

Cache flush invalidate, and pipeline flush invalidate incur several pipeline bubbles.

Interrupts, exceptions, and system calls incur several pipeline bubbles.

PIPE6 is asserted when the instruction fetch failed to provide any valid instructions to the processor pipeline when the time slot currently present at the execute stage was resident at the instruction decode stage. Knowing this information in addition to PIPE[2:1] can screen out cases where the instruction cache has not starved the processor pipeline.

As a first order estimate, one can assume that each CYCLE0, where PIPE6 indicates no valid instructions were available to the execute instruction slot when it was decoded, are due to instruction cache misses. Counting the total number of CYCLE0 events and the total number of events where PIPE6 was asserted during CYCLE0, one can determine the fraction of instruction fetches which incurred an instruction cache miss. This fraction is called the effective instruction cache miss rate.

When using this methodology, the resulting effective instruction cache miss rate is lower than the actual instruction cache miss rate. Not all instruction cache miss events are reported to the processor pipeline. Instruction cache prefetch nominally occurs independently of processor pipeline stalls (i.e. DBUSY and FBUSY). An instruction cache miss can be hidden while the processor pipeline is stalled. When the processor advances, the instruction fetch may have completed.

This first order approximation can be refined by examining additional processor pins, or revising the application code.

2.4 Determining the Frequency and Latency of Taken and Untaken Branches

Branches are a fundamental performance limiter in most processor designs. This is particularly true in RISC machines where efficient instruction decoding effectively decreases the latency between making successive branch decisions. Superscalar machines make this already serious performance limiter worse by effectively reducing the already small number of cycles between successive branch decisions. In typical applications, taken branches outnumber untaken branches.

The disclosed processor design can execute untaken conditional branches somewhat more efficiently than taken conditional branches. The peak performance through an untaken branch is 3 instructions per cycle. Peak performance thru a taken branch is taken branch is dependent on the number of instructions between branches but will be somewhat less than the untaken branch because the delayed branch instruction is executed as a single instruction group.

Due to limitations in the instruction prefetch queues and typical code scheduling restrictions, these peak performances will generally not be attained or sustained.

The disclosed processor implements branch prediction in the prefetch logic. It always attempts to fetch the target of the branch into a target instruction queue without overwriting the contents of the sequential instruction queue. Once the direction of the branch path is resolved, the appropriate instructions are sent to the instruction decode stage.

When a branch is observed in the instruction decode stage, the pipeline continues to execute normally for one cycle. In this additional cycle, the delay instruction is executed, possibly along with other instructions in the untaken stream. This implies that, if the branch is taken, some instructions have begun execution that such not have. The disclosed processor terminates the execution of these instructions for a taken branch as soon as the branch enters the execution stage. Invalidation of undesirable instructions is called a squash.

By examining the PIPE signals 51 during CYCLE0 events, one can determine the percentage of instructions that are branches and what fraction of branches are taken. Measuring the percentage of branches in the workload, the fraction that are taken, a histogram of the latency between successive branches, a histogram of the instructions between successive branch decisions, and uncovering the probability that the target of a branch instruction will reside in the instruction cache is very valuable information to both the processor vendor and the performance analyst.

2.5 Determining Frequency and Latency Between Context Switches:

Generating a histogram of the number of instructions between context switches as well as the latency between context switches would be very useful for the processor vendor and the performance analyst. Users make system calls to request operating system services. Hardware devices such as timers, graphics processors, disk controllers, and network controllers generate interrupts to signal device attention requests and as well as posting completion status.

All interrupts, system calls and faults cause entry into the operating system kernel of the system software and may force a context switch from a user context to the kernel. There may be a large execution penalty for switching between contexts.

Register window contents might be spilled to the memory stack. Translation tables might be revised. Caches entries might be flushed out to memory. System state tables must be updated. The user and kernel workload themselves will probably be very different. Updating processor state control registers can be expensive. Even when none of the above takes place, the working set of the cache will change. The TLB instruction, and data cache locality of the original context will be diluted. Upon resumption of that context, the loss of cache locality will cause a loss in execution momentum.

It is useful to system developers and performance analysts to know when the customers machine is being overloaded with too many interrupts. System designers can tune the way that interrupts are distributed. Performance analysts can distribute the existing interrupts over more machines. The problem can be restructured so that the necessary communication still meets user latency constraints without being disruptive.

With the advent of light-weight processes and multi-threaded control within the same process, it is expected that the relative frequency of context switches will increase. Many steps are being taken to reduce the cost of a context switch. Features such as unobtrusively tracking the frequency of context switches without disrupting the workload can assist the system software designer by providing measurements of context switch frequency instead of making inaccurate assumptions. Furthermore, cache miss rates can be broken into hit rates within a context switch to see the effects of cold start and process migration in a multi-processor hardware environment.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

We claim:

1. In a pipelined processor comprising an integer unit pipeline, a floating point unit pipeline, embedded instruction and data caches, and an instruction control unit, a method for unobtrusively monitoring processor states during execution of a proprietary application workload, said method comprising the steps of:

issuing and queuing a plurality of sequential instructions to said instruction control unit;

issuing and queuing a plurality of branch target instructions to said instruction control unit;

tracing a number of completed instructions comprising a sum of said sequential and branch target instructions issued during a stall-free cycle of said pipelined processor including providing a plurality of pins on a pin gate array for transmitting a plurality of PIPE signals;

coupling said pins through a coupler to a logic analyzer; and, recording said PIPE signals on said logic analyzer.

storing said number of completed instructions, determining the likely cause of a stall ending a stall free cycle based on a plurality of PIPE signals; and, tabulating and logically combining said number of completed instructions to determine said processor states on a cycle by cycle basis during execution of said proprietary application workload.

2. The method as set forth in claim 1, wherein providing said PIPE signals and tracing said number of completed instructions further comprises:

determining a total number of instructions completing execution;

if none of said sequential and branch target instructions are executed, determining:

whether a pipeline interlock exists, and whether an instruction fetch operation could not be completed in a single cycle;

if any of said sequential and branch target instructions are executed, determining if any of said instructions comprise branches, and if so, which branch path is selected;

determining if any of said sequential and branch target instructions comprise data memory references, and if so, can such data memory references be supplied to the pipelined processor within the same cycle;

determining if any of said sequential and branch target instructions comprise floating point memory references, and if so, can such floating point memory references be supplied to the pipelined processor within a single cycle;

determining if any of said sequential and branch target instructions comprise floating point arithmetic instructions, and if so, can such floating point arithmetic instructions be executed without stalling the integer unit pipeline; and, determining if any of said instructions comprise system calls to system software executing on said pipelined processor.

3. The method as set forth in claim 2, wherein said total number of instructions completing execution are tabulated and logically combined to determine:

a current state of said pipelined processor;

an instruction mix value;

an interrupt rate to said pipelined processor; and, a rate of system calls from said processor to said proprietary application workload.

4. The method as set forth in claim 3, wherein the step of tracing further comprises the steps of:

commencing at a first instruction of said proprietary application workload;

executing said sequential and branch target instructions such that said branch target instructions are chosen; and, comparing said current state of said pipelined processor, said instruction mix value, said interrupt rate to said processor, and said rate of system calls, representative of said proprietary application workload following execution of said branch target instructions to said current state of said processor, said instruction mix value, said interrupt rate to said processor, and said rate of system calls, representative of said proprietary application workload without execution of said branch target instructions.

5. (Amended) The method as set forth in claim 4, wherein the step of providing said PIPE signals further comprises:

asserting a first PIPE signal (PIPE0) when an interrupt or a system call is present in an execute stage of said pipelined processor;

asserting a second PIPE signal (PIPE1) and a third PIPE signal (PIPE2) representing the number of instructions present in the execute stage of said pipelined processor;

asserting a fourth PIPE signal (PIPE3) when a successor instruction of branch instruction comprises a target instruction stream;

asserting a fifth PIPE signal (PIPE4) when said pipelined processor is stalled because any floating point arithmetic instruction cannot be completed in a single cycle;

asserting a sixth PIPE signal (PIPE5) when said pipelined processor is stalled because said data memory references cannot be completed in a single cycle;

asserting a seventh PIPE signal (PIPE6) when no valid instructions are present when any instruction in the execute stage of said pipelined processor was resident in an instruction queue;

asserting an eighth PIPE signal (PIPE7) when a valid control transfer instruction is present in the execute stage of said pipelined processor;

asserting a ninth PIPE signal (PIPE8) when a valid floating point arithmetic instruction is present in the execute stage of said pipelined processor; and, asserting a tenth PIPE signal (PIPE9) when a valid data memory reference instruction is present in the execute stage of said pipelined processor.

6. The method according to claim 5, further comprising the steps of:

logically combining said fifth and sixth PIPE signals together to form a composite NOR representation thereof; and, latching said composite NOR representation to form a CYCLE0 signal.

7. The method as set forth in claim 6, wherein the step of forming said CYCLE0 signal further comprises determining an effective data cache miss rate, wherein said data cache miss:

occurs in a data translation lookaside buffer;

occurs when loading from said embedded data cache; and, occurs when a result store buffer is full and must be emptied before a data memory reference present in the execute stage of said pipelined processor can proceed.

8. The method as set forth in claim 7, wherein the step of forming said CYCLE0 signal further comprises determining:

that an entry in said results store buffer is required by said data memory reference present in the execute stage of said pipelined processor;

that a synchronous store instruction is present in the execute stage of said pipelined processor; and, that an atomic access instruction requiring multiple cycles for completing is present in the execute stage of said pipelined processor.

9. The method as set forth in claim 8, wherein the step of forming said CYCLE0 signal comprises determining an effective frequency of floating point code interlocks, wherein:

a floating point queue is full, and there is no capacity to accept a subsequent instruction;

a destination register of a floating point lcad instruction is interlocked and must be resolved before such instruction present in the execute stage of said pipelined processor can proceed;

a source register of a floating point store instruction is interlocked and must be resolved before such instruction present in the execute stage of said pipelined processor can proceed.

10. The method as set forth in claim 9, wherein the step of forming said second and third PIPE signals comprises determining an effective instruction cache miss rate, wherein said second and third PIPE signals indicate:

an instruction cache miss has occurred in an instruction translation lookaside buffer;

an instruction cache miss has occurred when loading from an embedded instruction cache; and, a data dependency between instruction groups exists at different stages of said pipelined processor, wherein said data dependency cannot be resolved by forwarding paths present in said proprietary application workload.

11. The method as set forth in claim 10, wherein the steps of forming said PIPE and CYCLE0 signals comprise determining an effective frequency and latency between branches, wherein:

a percentage of branches taken is computed;

an instantaneous and average latency between branches is computed; and, a number of instructions executed between successive branches is tabulated.

12. The method as set forth in claim 11, wherein the steps of forming said PIPE and CYCLE0 signals comprise determining an effective frequency and latency between a multiplicity of context switches, wherein:

a number of entries into an operating system kernel of said pipelined processor are tabulated;

an instantaneous and average latency between context switches is computed; and, a number of instructions executed between said context switches is tabulated.

13. In a pipelined processor comprising art integer unit pipeline, a floating point unit pipeline, embedded instruction and data caches, a monitor system for unobtrusively monitoring processor states during execution of a proprietary application workload, said monitor system comprising:

an instruction control unit coupled to said pipelined processor issuing;

the instruction control unit queuing a plurality of sequential instructions to said pipelined processor, said instruction control unit further issuing and queuing a plurality of branch target instructions to said pipelined processor;

a plurality of pins on a pin gate array coupled to said pipelined processor for transmitting a plurality of PIPE signals; and a logic analyzer coupled to the pins through a coupler for recording the PIPE signals, thereby tracing a number of completed instructions comprising a sum of said sequential and branch target instructions issued during a stall-free cycle of said pipelined processor:

said logic analyzer storing said number of completed instructions, and, tabulating and logically combining said number of completed instructions to determine said processor states on a cycle by cycle basis during execution of said proprietary application workload;

said logic analyzer further determining the likely cause of a stall ending a stall-free cycle based on a plurality of pipe signals.

14. The monitor system as set forth in claim 13, wherein said total number of instructions completing execution are tabulated and logically combined to determine:

a current state of said pipelined processor;

an instruction mix value;

an interrupt rate to said pipelined processor; and, a rate of system calls from said pipelined processor to said proprietary application workload.

15. The monitor system as set forth in claim 14, wherein:

said pipelined processor commences at the first instruction of said proprietary application workload;

said pipelined processor executes said sequential and branch target instructions such that said branch target instructions are chosen; and, said logic analyzer compares said current state of said pipelined processor, said instruction mix value, said interrupt rate to said pipelined processor, and said rate of system calls, representative of said proprietary application workload following execution of said branch target instructions to said current state of said pipelined processor, said instruction mix value, said interrupt rate to said pipelined processor, and said rate of system calls, representative of said proprietary application workload without execution of said branch target instructions.

16. The monitor system as set forth in claim 15, wherein said monitor system further comprises:

a plurality of PIPE signals further comprising:

a first PIPE signal (PIPE0) asserted when an interrupt or a system call is present in an execute stage of said pipelined processor;

a second PIPE signal (PIPE 1) and a third PIPE signal (PIPE2) representing the number of instructions present in the execute stage of said pipelined processor;

a fourth PIPE signal (PIPE3) asserted when a successor instruction of a branch instruction comprises a target instruction stream;

a fifth PIPE signal (PIPE4) asserted when said pipelined processor is stalled because any floating point operate instruction cannot be completed in a single cycle;

a sixth PIPE signal (PIPE5) asserted when said pipelined processor is stalled because said data memory references cannot be completed in a single cycle;

a seventh PIPE signal (PIPE6) asserted when no valid instructions were present when any instruction in the execute stage of said pipelined processor was resident in an instruction cache;

an eighth PIPE signal (PIPE7) asserted when a valid control transfer instruction is present in the execute stage of said pipelined processor;

a ninth PIPE signal (PIPE8) asserted when a valid floating point arithmetic instruction is present in the execute stage of said pipelined processor; and, a tenth PIPE signal (PIPE9) asserted when a valid data memory reference instruction is present in the execute stage of said pipelined processor.

17. The monitor system according to claim 16, further comprising;

a NOR gate, wherein said fifth and sixth PIPE signals are combined together to form a composite NOR representation thereof; and, a latch for latching said composite NOR representation to form a CYCLE0 signal.

18. The monitor system as set forth in claim 17, wherein said CYCLE0 signal further comprises an effective data cache miss rate, wherein said data cache miss:

occurs in a data translation lookaside buffer;

occurs when loading from said embedded data cache; and, occurs when a result store buffer is full and must be emptied before a data memory reference present in the execute stage of said pipelined processor can proceed.

* * * * *

UNITED STATES PATENT AND TRADEMARK OFFICE
CERTIFICATE OF CORRECTION

PATENT NO. : 5,594,864
DATED : January 14, 1997
INVENTOR(S) : Trauben

It is certified that error appears in the above-identified patent and that said Letters Patent is hereby corrected as shown below:

Column 16,
Line 34, please delete "Icad" and insert -- Ioad --.

Column 17,
Line 7, please delete "art" and insert -- an --.

Signed and Sealed this

Nineteenth Day of November, 2002

Attest:

JAMES E. ROGAN
Attesting Officer  Director of the United States Patent and Trademark Office